United States Patent

Kuusinen

[19]

[11] Patent Number: 5,917,868
[45] Date of Patent: Jun. 29, 1999

[54] METHOD AND CIRCUITRY FOR COMPENSATING INTERNAL TIMING ERRORS OF A MOBILE STATION

[75] Inventor: Tero Kuusinen, Turku, Finland

[73] Assignee: Nokia Mobile Phones Ltd., Salo, Finland

[21] Appl. No.: 08/717,570

[22] Filed: Sep. 23, 1996

[30] Foreign Application Priority Data

Oct. 23, 1995 [FI] Finland ..................................... 955045

[51] Int. Cl.$^6$ ................................ H04L 7/00; H04L 7/04
[52] U.S. Cl. ............................................. 375/354; 375/362
[58] Field of Search .................................... 375/232, 354, 375/365, 366, 368, 372, 355, 344, 371, 231

[56] References Cited

U.S. PATENT DOCUMENTS 5,317,595  5/1994  Ostman ................................... 375/232
5,563,888  10/1996  Parr et al. ................................ 375/344
5,706,314  1/1998  Davis et al. ............................. 375/368
5,710,796  1/1998  Jarvela et al. ........................... 375/344

*Primary Examiner*—Don N. Vo
*Assistant Examiner*—Albert C. Park
*Attorney, Agent, or Firm*—Perman & Green, LLP

[57] ABSTRACT

The invention concerns a method and circuitry for compensating internal timing errors of a mobile station, particularly those of a digital mobile station. According to the invention, the signal samples that include the maximum amount of energy and the position signals (maxpos) of these maximum signal samples are, by means of a correlator (8), determined from a channel impulse response estimated in a way known in the art, and in a timing unit (6), with help of successive position signals (maxpos), a correction signal is determined that indicates the magnitude and direction of the timing error of the mobile station, and by said correction signal the ting of the mobile station and particularly that of its clock system is checked and, if necessary, synchronized.

17 Claims, 5 Drawing Sheets

METHOD AND CIRCUITRY FOR COMPENSATING INTERNAL TIMING ERRORS OF A MOBILE STATION

FIELD OF THE INVENTION

The present invention concerns a method for compensating timing errors of a mobile station, particularly those of a digital mobile station.

The invention also concerns a circuitry for compensating timing errors of a mobile station, particularly those of a digital mobile station.

BACKGROUND OF THE INVENTION

Adapted to a mobile station, there is known in the art a clock system that operates the whole time with high frequency. One drawback of this system is that the clock system uses a considerable amount of energy, whereby it is not suitable especially for small and lightweight mobile stations like mobile phones. In order to save the battery of the mobile station, a new clock system, a so called sleep clock system has been developed.

One sleep clock system known in the art is disclosed in the Finnish patent application no 923976 filed earlier by the same applicant. The sleep clock system comprises two clock devices, the first of which is arranged to act with high frequency and the second with low frequency. The first clock device, the normal clock, operates on the megahertz band and the second clock device, the sleep clock, on the kilohertz band. The first clock device is switched off and the second clock device with lower accuracy is employed instead, when the mobile station is in a rest condition. By this arrangement the power consumption can be significantly decreased.

The sleep clock system described above is used e.g. in mobile stations of the GSM (Global System for Mobile Communications) system based on time division multiple access (TDMA). When the normal clock device of the mobile station's sleep clock system is switched off, the receiver of the mobile station is arranged to receive radio signals from the base station only in certain predefined time stamps. The sleep time of the mobile station between two pages, said page being the time it is prepared to recognize an eventual incoming call, is relatively long, in the range of 1 to 2 seconds. This time slot must be accurately measurable.

One problem of the present mobile stations, in which the sleep clock arrangement is used, is that there is generally used a crystal as a heart of the second clock device for synchronizing it. The crystal is always involved with frequency jitter that is in this application typically in the range of $0.5\ \mu s$. In a GSM mobile station this corresponds to about ⅛ of a bit period.

In addition, one problem is that the frequency of the crystal changes according to the temperature changes. The nominal frequency is in general achieved at a temperature of 25° C. It can be stated that the bigger the temperature difference compared e.g. with the nominal temperature of 25° C. is, the bigger is the frequency shift. A mobile station must operate reliably in a temperature range from −10° C. up to +55° C. Based on the maximum change speed of the frequency, and taking into account that the sleep time between two pages in the GSM system is max. 2.12 s, it can be estimated that a timing error between the beginnings of two pages is in the worst case about $6.2\ \mu s$/° C. Further, if we estimate that the present lightweight mobile stations can warm/cool e.g. 1° C./min, the resulting timing error for a period of one minute is about $6.2\ \mu s$. When that is divided by the paging frequency, the resulting time error in the worst case between two pages is $0.2\ \mu s$. Even though the time error between two pages is not big, it is cumulative. In case the frequency shift, that is, the cumulative timing error is not compensated by some means, it will soon make the communication system between the mobile station and the base station fail.

In addition to the above mentioned crystal, another problem is involved with the sleep clock arrangement. A timing error of the same kind as the frequency jitter is generated when the clock frequency of the sleep clock system is changed. The second clock of the sleep clock system, in other words, the sleep clock, operates in the kilohertz band, whereas the normal clock operates in the megahertz band. The first clock operating with higher frequency must be on before the clock frequency can be changed from the second clock to the first one. The change of the clock frequency is an asynchronous process. In connection with each change, the stabilization of the normal clock takes some time. The timing error related to the change is in that case half of a clock cycle of the normal clock, that is, about $0.5\ \mu s$. The start of a paging function is also an asynchronous process. The signal receiver of the mobile station cannot be sure that the received paging signal really starts at the edge of the signal of its normal clock. Accordingly, this also involves a timing error that is a half of a clock cycle of a normal clock, that is about $0.5\ \mu s$.

Based on what has been stated above, it can be estimated that in the worst case the total timing error between two pages will be formed as follows:

| | |
|---|---|
| Frequency jitter of the crystal | $0.5\ \mu s$ |
| Temperature roaming of the crystal | $0.2\ \mu s$ |
| Change of clock frequency | $0.5\ \mu s$ |
| Starting point of page | $0.5\ \mu s$ |
| | $1.7\ \mu s$/page |

So, the total timing error between two pages is $1.7\ \mu s$, that is about a half of a bit period of the GSM network.

The channel conditions have a significant influence on how well the radio frequency (RF) receiver can receive an RF signal transmitted from the base station. When the mobile station operates during the page with the normal clock frequency, the variations and changes of the channel conditions can be fairly well estimated and so the RF signal transmitted by the base station can be received by the receiver of the mobile station. When the timing error of the own internal clock system of the mobile station must also be estimated in the mobile station, the situation will be changed. The RF signal receiver of the mobile station can't be sure that the page transmitted by the base station starts at the very moment that is indicated by its own timing device. The eventual frequency error of the sleep clock system can also look like an error caused by bad channel conditions.

When the channel conditions are bad, in other words, when there are deep fades and a lot of reflections (caused e.g. by a hilly landscape and a Doppler effect) in the received RF signal, the clock system of the mobile station easily fails in synchronizing. The elements of the mobile station can't judge, if the timing error is caused by bad channel conditions or by the clock system. The elements of the mobile station aim at keeping up the timing signal of the mobile station and its synchronizing in respect to the base station clock. Based on this, a correction signal is tried to be estimated in order to correct the long term timing error, in other words, the frequency error. Bad channel conditions can be expressed as a frequency error of the internal timing of the mobile station. This very soon makes the mobile station to loose the synchronizing to the signal frame structure with respect to the base station. It must be noticed that the sleep clock system is not stable in bad channel conditions, even if an optimized receiver construction like the Maximum Likelihood Sequence Estimator (MLSE) were used.

SUMMARY OF THE INVENTION

An object of their present invention is to provide a new method and a circuitry for compensating the timing errors of a mobile station, particularly those of a digital mobile station. An object of the present invention is particularly to provide a new method and circuitry for specifying, based on the RF signal received by the mobile station, a correction signal, by means of which the eventual timing errors of the clock system can be compensated.

According to the invention, in the method for compensating the internal timing errors of a mobile station, in particular those of a digital mobile station:

it is determined from a channel impulse response estimated in a way known in the art, the signal samples that include a maximum amount of energy and the position signals of these maximum signal samples; and it is determined by means of successive position signals a correction signal that indicates the magnitude and direction of the timing error of the mobile station, and by means of which the timing of the mobile station and particularly that of its clock system will be checked and, if necessary, synchronized.

According to the invention, the circuitry for compensating the internal timing errors of a mobile station, in particular those of a digital mobile station comprises:

a correlator for determining from a channel impulse response estimated in a way known in the art the signal samples that include a maximum amount of energy and the position signals of these maximum signal samples; and a timing unit, where with help of the successive position signals, a correction signal is determined, that indicates the magnitude and direction of the timing error of the mobile station and by which the timing of the mobile station and in particular that of its clock system is checked and, if necessary, synchronized.

An advantage of the invention is the simple and efficient way of detecting and compensating internal timing errors (or errors interpreted as those) in a digital mobile station. Internal timing errors are due to the structure and operation of the mobile station, such as the internal clock crystal and/or connection of the clock system and the frequency changes related thereto.

A further advantage of the present invention is that it can be integrated as a substantial part to the mobile station, irrespective of the clock system that is used in it. By means of the method and circuitry in accordance with the invention, a correction signal is produced, by means of which the timing errors of the mobile station and in particular those of its clock system can be detected and corrected.

A particular advantage of the invention is that it facilitates the implementation of a reliable sleep clock system.

BRIEF DESCRIPTION OF THE DRAWINGS

In the following, the present invention and its further advantages are described with reference to the enclosed drawings, wherein.

DETAILED DESCRIPTION OF THE INVENTION

Figure 1:
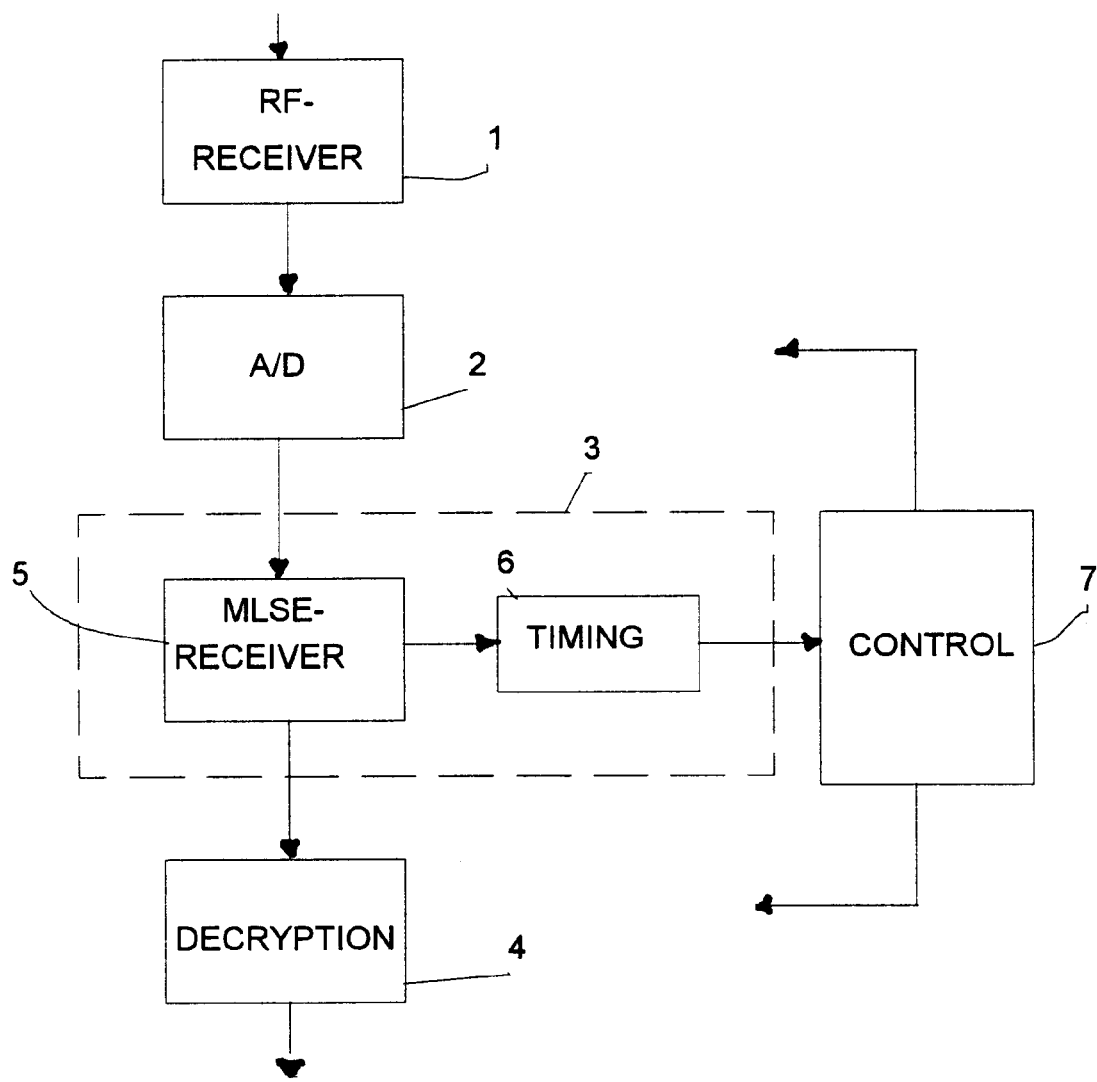
FIG. 1 illustrates as a block diagram a part of the receiving end of the mobile station with a circuitry according to the invention adapted thereto.

The receiving end of a mobile station arranged to operate in a GSM network is illustrated in FIG. 1 for the parts that are related to the present invention. The RF signal received by the mobile station is supplied to the RF receiver 1 and a low frequency signal is forwarded from there to the A/D converter 2. The signal samples, such as the TDMA bursts are forwarded to the detection and demodulation unit 3. From this unit the signal is forwarded to the decryption unit 4. With help of the control unit 7, the operation of the mobile station is controlled and monitored.

The detection and demodulation unit 3 comprises a receiving unit 5 and a timing unit 6. By means of the receiving unit 5 the signal is detected and demodulated. The receiving unit 5 is preferably implemented as an optimized receiver construction and it is in this embodiment a Maximum Likelihood Sequence Estimator MLSE. A function of the MLSE receiver 5 is to estimate the radio communication channel with help of those signal structures that are included in the transmitted signal for facilitating the estimation. By means of the timing unit 6, a correction signal is determined from the received signal, said correction signal indicating the starting point of the page and being forwarded to the control unit 7 to be processed further. With help of this output signal of the timing unit 6, that is, the correction signal, the timing of the clock system included in the correction unit 7 can be checked and, if necessary, corrected.

As it is well known, there are changes occurring continuously in the transmission channel, which changes influence the radio signal by causing multipath fading and Doppler dispersion. Thus, the received signal includes, in addition to the original signal, also the same kind of signal copies as the original but received at different times than the original one. Additionally, the stage of the received signal can vary occasionally. For this reason the channel estimation is required for correcting the errors of the signal caused by the radio channel. For this purpose, structures are added to the signal for facilitating the estimation. One possibility is that a predefined bit pattern is added to a predefined point of the page in the radio signal. The receiver finds this bit pattern and makes the channel estimation based on that. This principle is used in the MLSE receiver 5.

Figure 2:
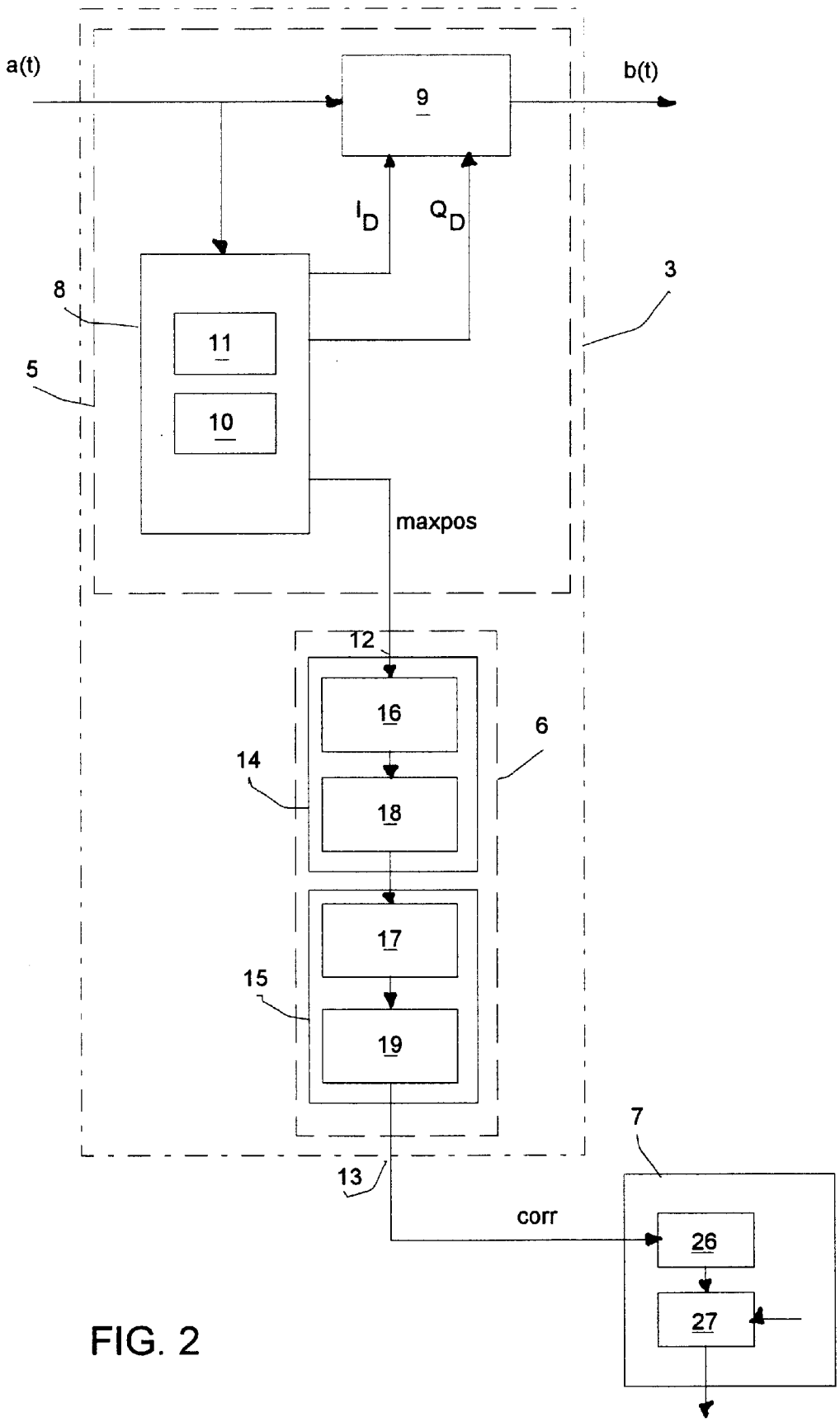
FIG. 2 illustrates as a block diagram a detection-demodulating unit of a mobile station.

The detection and demodulation unit 3 is illustrated as a block diagram in FIG. 2. The MLSE receiver 5 comprises a correlator 8 and an equalizer 9. With help of the correlator 8, the impulse response of the transmission channel is calculated in a certain time slot of the received signal, like the TDMA burst. This time slot is a part of the received signal, said time slot comprising data bits and a known bit pattern related to the synchronizing. Calculation of the impulse response of the channel is based on the correlation between the known bit pattern stored in the correlator 8 and the corresponding bit pattern expressed in the received time slot. So, the known bit pattern is stored in the memory unit 10 of the correlator 8, from where it is retrieved to the processing unit 11 of the correlator 8 when counting the correlation. The processing unit 11 comprises e.g. a microprocessor or a corresponding data processing and calculating means.

The input signal of the correlator 8 is a complex signal a(t) that consists of I and Q signals (the GSM mobile communication system/GMSK modulation). In the correlator 8, the impulse, responses are calculated for both I and Q signals. The calculated impulse responses are the estimates of the channel conditions during the respective time slot of the received signal.

The input signal a(t) is subject to the following calculations that are performed in the processing unit 11 of the correlator 8 for receiving the desired output signal maxpos for the timing unit 6. The magnitude of the estimated impulse response can be calculated by the following formula:

$$m_n(t) = \sqrt{I_{Dn}^2 + Q_{Dn}^2} \qquad (1)$$

where n=1, 2, 3, . . . k and k=the number of the calculated correlations.

Figures 3A, 3B:
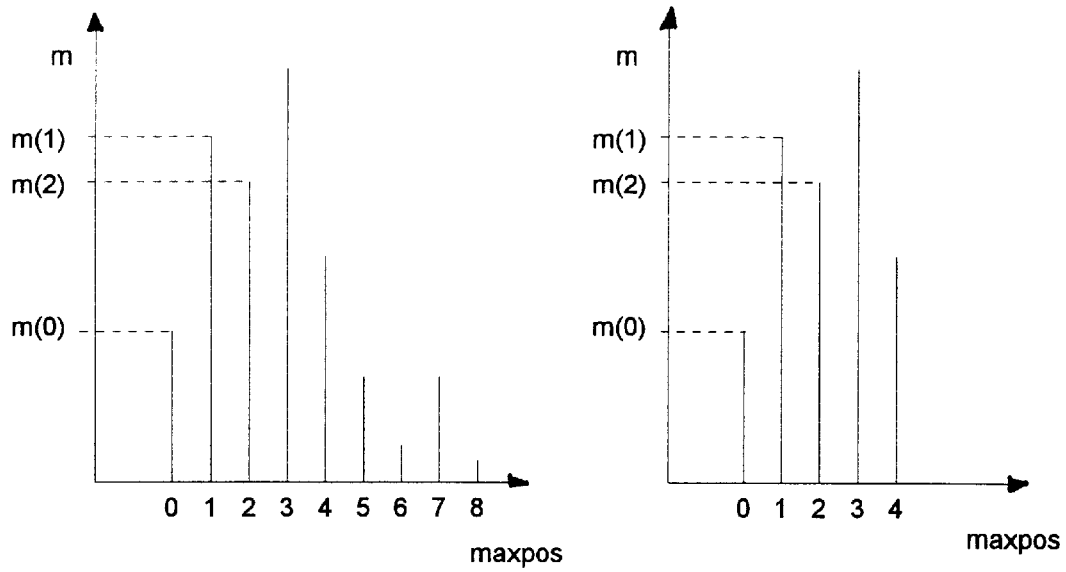
FIGS. 3a and 3b illustrate impulse response tabs and respectively a selected subgroup thereof.

A group of impulse response tabs is calculated in the processing unit 11, but usually all these are not fed to the equalizer 9. So, the calculated impulse response tabs are subject to selection and the tabs that give the best channel impulse response are selected. The selection is implemented in the processing unit 11 so that among all calculated impulse response tabs those are selected that include the most energy. Further, it must be noticed that the selected tabs always form a group, that is, the correlator 11 can't select one tab here and one tab there. In this respect reference is made to FIGS. 3a and 3b. FIG. 3a shows how the magnitudes of nine impulse response tabs have been calculated and FIG. 3b shows the group of five tabs selected among those. The selection algorithm for five impulse response tabs is so that the magnitudes m(i) of the impulse tabs of this group are calculated by formula 2:

$$m(i) = \sum_{j=0}^{4} \{I_{D(i+j)}^2 + Q_{D(i+j)}^2\}, \qquad (2)$$

i=4-s, 3-s, 2-s, . . . , 4+s, whereby s=the window width of the impulse response.

From the group m(i) of the calculated impulse response tabs the subgroup of those tabs is looked for that includes the maximum quantity of energy (FIG. 3b). From this subgroup the impulse response tab is selected that includes the maximum quantity of energy compared with the other tabs of the subgroup, and the location of this is expressed as a position signal maxpos according to formula 3:

(3) maxpos=max[m(i)], i=4−s, 3−s, 2−s, . . . , 4+s.

The final impulse response will be calculated by formula 4:

(4) $I_{D(i)}=I_{D(i+maxpos-2)}$ and $Q_{D(i)}=Q_{D(i+maxpos-2)}$, wherein i=0, 1, 2, 3, 4.

The $I_D$ and $Q_D$ outputs of the correlator 8 are combined into the equalizer 9. The received signal a(t) is also fed to the equalizer 9. The purpose of the equalizer 9 is to equalize the received signal a(t) with help of the estimated channel impulse response. The technique in itself is widely known. It employs a matched filter and a modified Viterbi algorithm for signal processing. The estimated impulse response tabs are fed to the matched filter and processed. The output of the equalizer 9 gives an equalized signal b(t) for the decryption unit 4 (compare FIG. 1).

The position signal maxpos calculated in the correlator 8 expresses the position of the maximum energy (that is, the position of the impulse response, the energy content of which is the biggest) in the received TDMA (like GSM) burst. For one received burst one position signal is received.

The position signal maxpos is fed to the timing unit 6. This timing unit 6 comprises two filter units 14, 15 that are series connected with each other. The position signal output of the correlator 8 is connected to the input 12 of the first filter unit. The output 13 of the timing unit 6, which is also the output of the second filter unit, is further connected to the control unit 7.

The first filter unit 14 comprises a first filter 16 and a separator 18 following this. By the separator 18, only desired output signals of the first filter 16 are allowed to pass to the second filter unit 15.

The second filter unit 15 comprises a second filter 17 and a scaler 19. By the scaler 19 the output signal corr of the timing unit 6 is set to the suitable scaling window for the purpose of compensating the timing errors.

The first filter 16 comprises an n state floating register 20 (FIG. 4), that is preferably a fifo-register (that is, a floating register where one signal sample comes in whereby another goes out). The position signal maxpos received from the correlator 8 is fed to the first filter 16, that is, in this case to the input 12 of the fifo register 20. The maxpos value of the position signal expresses the position of the maximum energy of the impulse response, and it can be calculated in connection with the calculation of the impulse response in the correlator 8, as described above.

The calculated position signals maxpos are fed one after another to the fifo register 20 of the first filter 16, and after input of each signal the sum of the signal samples in the register 20 is calculated by the summer 21, after which the received sum "sum" is further fed to the decision unit 22, where the sum is compared with the decision parameters, and the intermediate output signal is given, based on the comparison, further to the separator 18. The output of the separator 18 and, simultaneously, the output of the first filter 14, gives the output signal of the first filter unit to be fed to the second filter unit 15.

In the following we deal in detail with the procedures that are implemented in connection with the first filter unit 14. The sum "sum" of the position signals in the fifo register 20 is calculated with the summer 21 according to formula 5:

$$\text{sum} = \sum_{i=1}^{n} d(i) \quad (5)$$

wherein d(i) is the content of the memory element $20^1$, $20^2$, $20^3$ ... $20^n$ of the $i^{th}$ floating register 20 and n is the number of elements.

The sum "sum" of the position signals present in the register 20 at a certain moment is compared in the decision unit 22 with the decision parameters. For determination of the decision parameters, the information of the nominal stage of the position signal is required. It can be in principle any signal value, so let it be nom, which is an integral number. The sum of the n position signals with nominal value is ave=n* nom. This value ave is compared with the real sum "sum" of the position signals received from the summer 21. If the sum "sum" of the real position signals is bigger than the sum ave, it means that the position signals differ a lot from the estimated nominal stage and, accordingly, that the value of the timing correction to be performed, that is, the value of the correction signal, must be big. By using if-so statements the values of the intermediate signals ot to be selected, $N_n$, $N_{n-1}$, ... , $N_2$, $N_1$, NP, $P_1$, $P_2$, ... , $P_{n-1}$, $P_n$, can be expressed in the form of table 6:

TABLE 6

| | |
|---|---|
| IF sum < ave - $a_n$ | SO ot = $N_n$ |
| IF sum < ave - $a_{n-1}$ | SO ot = $N_{n-1}$ |
| IF sum < ave - $a_2$ | SO ot = $N_2$ |
| IF sum < ave - $a_1$ | SO ot = $N_1$ |
| IF sum - $a_1$ < ave < ave + $a_1$ | SO ot = $N_P$ |
| IF sum > ave - $b_1$ | SO ot = $P_1$ |
| IF sum > ave - $b_2$ | SO ot = $P_2$ |
| IF sum > ave - $b_{n-1}$ | SO ot = $P_{n-1}$ |
| IF sum > ave - $b_n$ | SO ot = $P_n$ |

The decision parameters are ave-$a_n$, ave-$b_n$, wherein n=1, 2, 3, ... (integral number). The first decision parameter is formed from the sum of the nominal values of the position signals. The other decision parameters $a_n$, $b_n$ are integral numbers that are suitably selected depending on the application. This is illustrated in FIG. 4 by the decision table 22a included in the decision unit 22, in accordance with the following table 7:

TABLE 7

| | |
|---|---|
| IF sum < ave −11 | SO ot = −3 |
| If sum < ave −7 | SO ot = −2 |
| IF sum < ave −3 | SO ot = −1 |
| IF ave −3 < sum < ave + 3 | SO ot = 0 |
| IF sum > ave +3 | SO ot = 1 |
| IF sum > ave +7 | SO ot = 2 |
| IF sum > ave +11 | SO ot = 3 |

Figure 4:
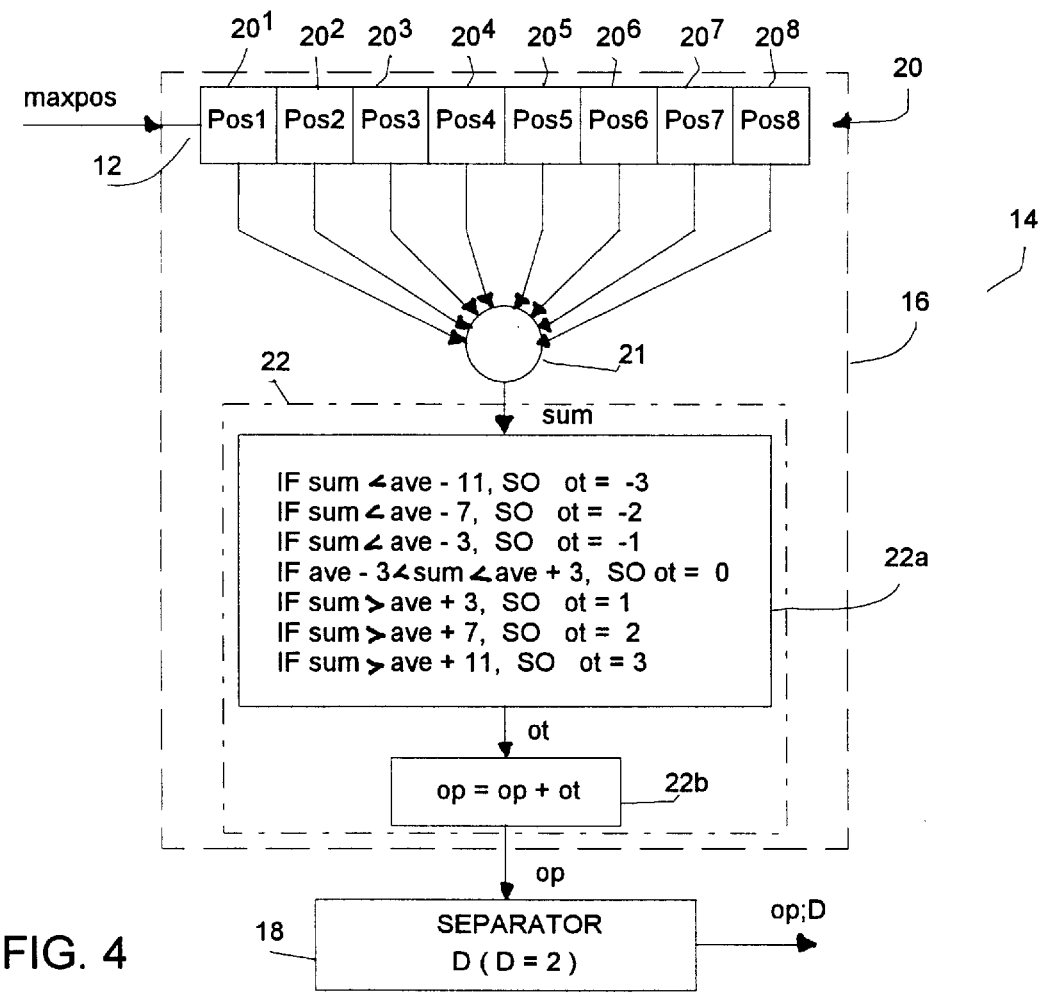
FIG. 4 illustrates a first filter unit of the timing unit as a block diagram.

In the example of FIG. 4, the fifo register 20 consists of eight memory elements $20^1$, $20^2$, ... , $20^8$ (Pos1, Pos2, Pos3, ... , Pos8) where eight successive position signals are saved into. In this embodiment n=8 and the nominal value of the position signals nom=4, whereby ave=8×4=32. The values of the other decision parameters $a_n$, $b_n$ are 11, 7, 3 and the corresponding values of the intermediate signals ot: 31 3, −2, −1, 0, 1, 2, 3. From the decision table 22a of the decision unit 22 can be derived the intermediate signal ot, the value of which is one of said integral numbers: −3, −2, −1, 0, 1, 2, 3.

In this embodiment the decision unit 22 comprises in addition to the decision table 22a also the summer 22b. The first intermediate signal received from the decision table 22a of the decision unit is summed in the summer 22b with the corresponding intermediate signal calculated earlier in the previous phase, whereby the cumulative intermediate signal is received according to formula 8:

(8) op=op+ot

The cumulative intermediate signal op represents the output signal of the decision unit 22.

The cumulative intermediate signal op can be used as output signal of the first filter unit 14, but in most cases it is preferable to smoothen the output signal by feeding it first to the separator 18. The separator 18 passes through every $D_{th}$ signal, whereby D is an integral number from group 1, 2, 3, .... If we assume that a series of cumulative intermediate signals: op0, op1, op2, op3, op4, op5, op6 .... is fed into the separator 18, and D=2, so the output signal of the separator 18, that is, the series of the op;D (D=2) of the output signals of the first filter unit is op0, op2, op4, op6, ... (compare FIG. 4). Thus, in this embodiment the correction signal corr is received every other time, when the maxpos signal is entered. With help of the separator 18, the correction of the timing is attenuated and smoothened so that it does not happen too fast and suddenly with respect of the units following it, especially those of the control unit 7 and the MLSE receiver 5.

Figure 5:
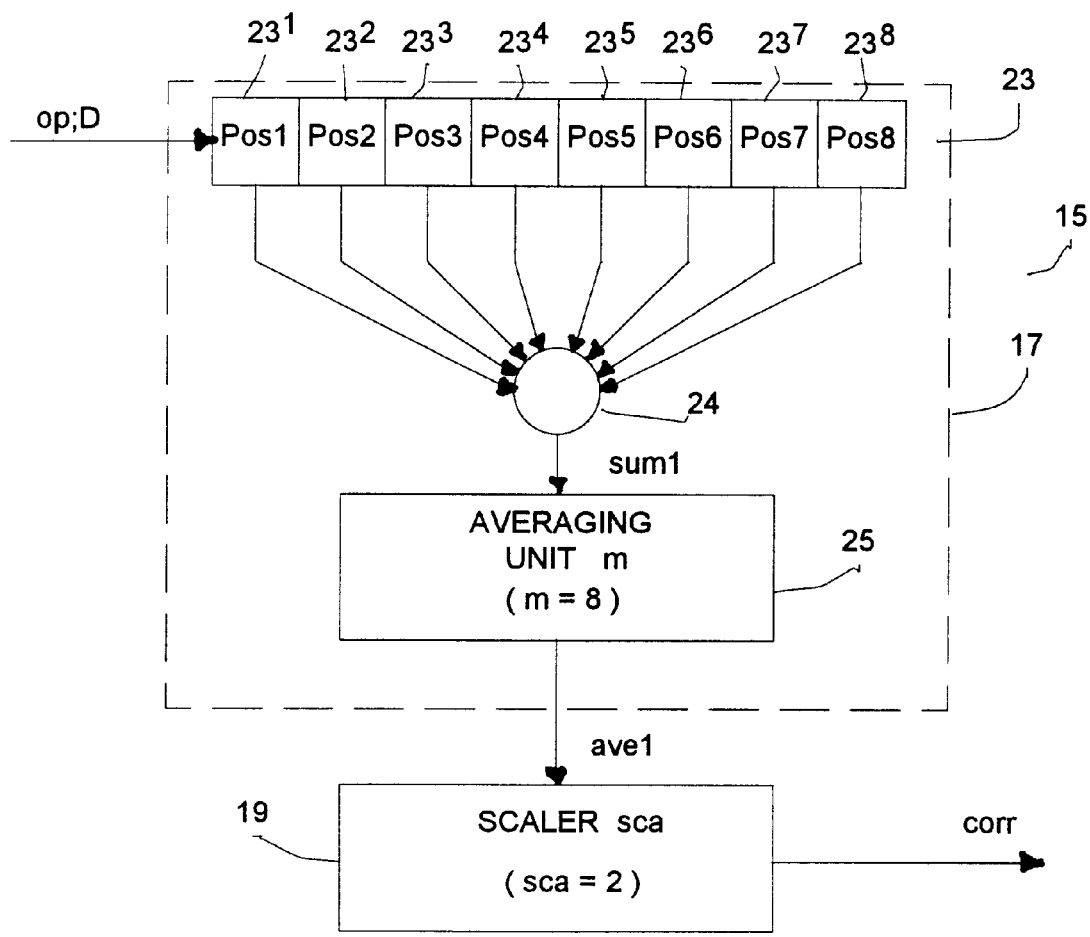
FIG. 5 illustrates a second filter unit of the timing unit as a block diagram.

Referring now to FIG. 5, the second filter unit 15 includes an m state floating register 23. This floating register is preferably a fifo-register and its structure corresponds to the fifo register 20 of the first filter. The output signal op; D of the first filter unit 14 is fed into the input of the register 23. The successive op; D values of the output signals are saved to the memory elements $23^1$, $23^2$, $23^3$, ... $23^m$ (Pos1, Pos2, Pos3, ... , Posm) of the floating register 23. The content of the register 23 is averaged, that is, the mean value is calculated from the op; D values of the included output signals of the first filter unit: the sum of the signals sum1 is calculated with the summer 24 and the result is divided by the number m of the elements $23^1$, $23^2$, $23^3$, ... $23^m$ of the register 24 in the averaging unit 25. The mean value of the signals included in all elements of the register 23 is ave1= sum1/m. The signal ave 1 is the output signal of the second filter unit 15.

It is, however, preferable to arrange additionally the scaler 19 to the second filter unit 15, where the intermediate signal ave 1 of the second filter unit is fed to. So it is just the output signal corr of the scaler 19 that forms the output signal of the second filter unit 15 and at the same time the output signal of the timing unit 6, that is the timing correction signal. In this way the timing error correction is made more slowly in order to prevent the system from falling into an unstable state.

The function of the scaler 19 of the second filter unit 15 is to adapt the output signal of the second filter to those correction limits, in other words, variation limits, within which the MLSE receiver can process the output signal. If the timing error correction is too fast, the whole receiver falls into an unstable state and starts to oscillate. If the timing error correction is too slow, the MLSE receiver is not fast enough to perform the correction, that is received from the clock system of the mobile station through the control unit 7. Accordingly, the following procedure is implemented by the scaler 19 to the intermediate signal ave1 fed into it:

(9) corr=ave 1/sca, wherein sca=real number, typically ranging from 0,25 to 4.

In the second filter unit illustrated by FIG. 5, the number of the op; D values of the output signals of the first filter unit which values can be collected to register 23 is m=8 and the parameter of the scaler 19 is sca=2. Thus, in this embodiment the correction signal corr is received from the timing unit 6 every other time, when the position signal maxpos is entered and the range of this correction signal corr is limited to the half of the range of the intermediate signal ave1.

The output signal of the timing unit 6, that is, the correction signal corr is fed into the control unit 7 of the mobile station. The correction signal corr includes in principal information, whether the timing is OK, and if not, how big the error is and in which direction. By means of this arrangement, for example, the fast normal clock of the sleep clock system can be replaced between two pages by the sleep clock and the right timing of the mobile station is still maintained. It must be noticed, that the sleep clock can operate also at another time than between two pages (e.g. when the mobile station is used for communication).

The correction signal corr of the timing unit 6 is processed in the control unit e.g. in the following way. The control unit 7 comprises a derivation unit 26 (FIG. 2), where the correction signal corr is fed to. Here the correction signal corr is derived, whereby it is possible to find out, when the timing of the clock system must be changed and to which direction. The output signal of the deriving unit 26, in turn, is fed to the clock unit like e.g. sleep clock system 27 in order to correct the timing so that the starting point of the page is synchronized with the clock signal.

Figure 6:
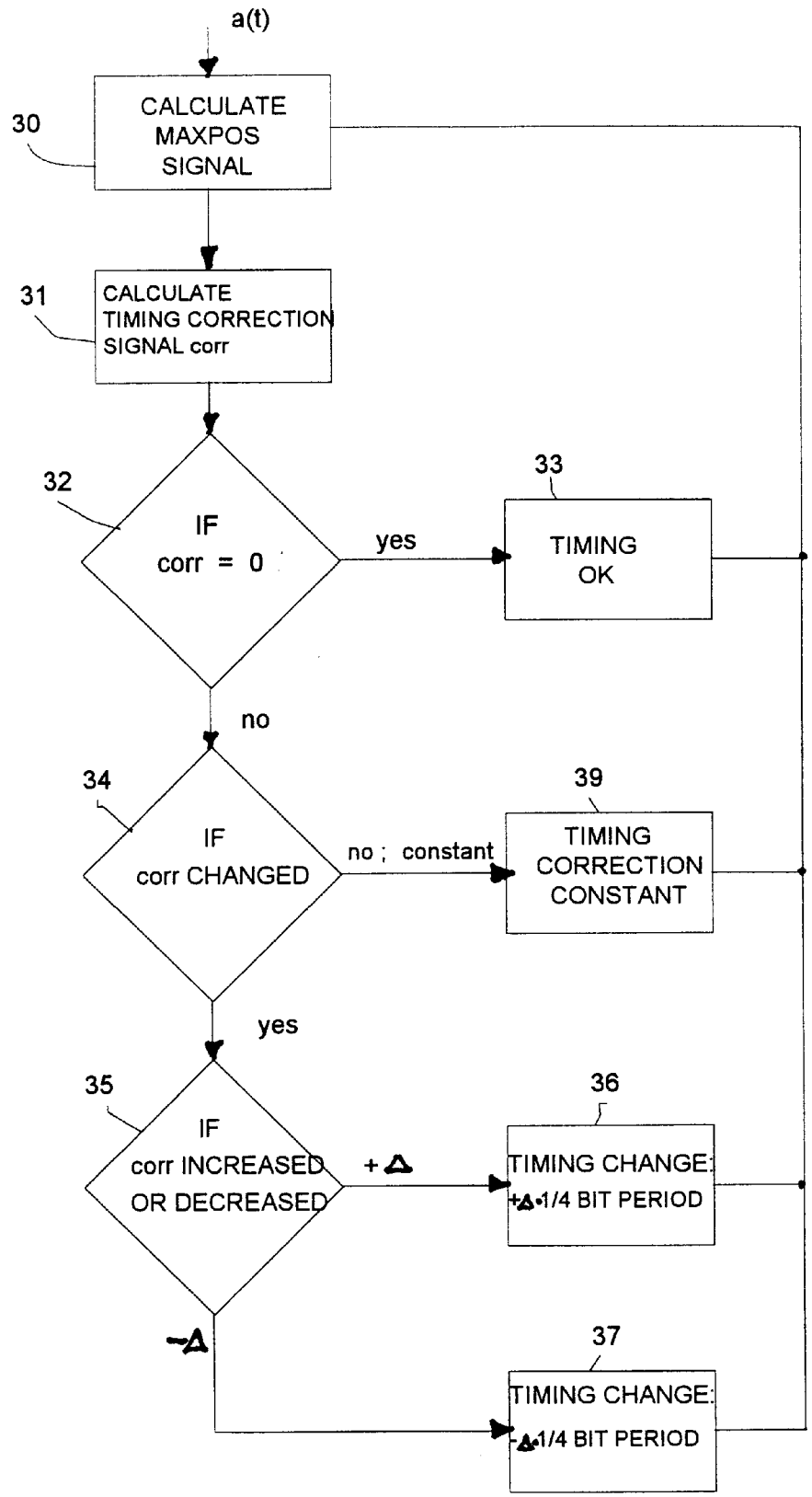
FIG. 6 illustrates as a flow diagram one method according to the invention for checking and correcting the timing of the mobile station.

The internal timing of the mobile station is corrected in the embodiment described above in the following way (compare flow diagram of FIG. 6). The position signal maxpos values are calculated in the correlator 8, as described above (phase 30). In the embodiment described above, these are integral numbers the range of which depends on the width of the correlating window of the correlator 8. The position signal maxpos values can range e.g. between $-4, -3, \ldots, 3, 4$ or $0, 1, 2, 3, 4$. From these position signal values the correction signal corr is calculated in the timing unit 6 (phase 31). The value of the correction signal corr is in general an integral number that indicates how big the timing error of the mobile station clock is. In this embodiment of the GSM network the timing error is given with an accuracy of ¼ bit period (=923 ns).

At the beginning the correction signal of the timing unit 6 is corr=0. This is tested (phase 32) in the control unit 7 and it is noticed that the timing is OK (phase 33), in other words, no error is found in it and there is no need to correct the timing. When paging is started with the mobile station and time passes, it happens at some point that the correction signal calculated from the position signals maxpos with help of the timing unit 6 is corr0. This is noticed at the testing phase of the correction signal (phase 32). Thus, the correction signal corr of the timing unit 6 indicates that the frequency of the mobile station clock has changed and the timing of the clock system must be corrected.

Let us assume that the following correction signal received from the timing unit 6 is corr 1. This change of the correction signal is noticed at the testing phases, where it is first noticed that corr 0 (phase 32) and that the value of the correction signal corr has changed (phase 34) and, in particular, that it has increased (phase 35) by the value $\Delta=+1$. The timing will be changed according to the change $\Delta$ of the correction signal corr (phase 36). With help of the control unit 7, the other parts of the mobile station are informed that due to the frequency change of the clock system like a clock crystal, the normal clock included in the sleep clock system 27 of the mobile station must be activated next time by $\Delta\times\frac{1}{4}$ bit period (=$\Delta\times923$ ns), wherein $\Delta=+1$, earlier than at this observation time. In this way the timing error caused by the frequency change of the clock system will be corrected.

Let us further assume that the correction signal of the timing unit 6 is corr=1. Next time the correction signal corr gets the value corr=2. This information is given by the timing unit 6 to the control unit 7, by which the positive change of the correction signal corr, that is, addition $\Delta=+1$ is detected (phases 32, 34, 35) and the timing will be changed again with help of the control unit 7, as described above. Let us further assume that the correction signal corr next time changes to value corr=1, whereby the control unit 7 again reacts to the change, and the value of the correction signal corr this time decreases. The change $\Delta=-1$ of the correction signal corr is detected at the testing phases, whereby the first observation is that corr 0 (phase 32) and that the value of the correction signal corr has changed (phase 34) and, in particular, decreased (phase 35). The timing will be changed according to the negative change of the correction signal corr, in other words, according to the difference $\Delta=-1$ (phase 37). With help of the control unit 7, the mobile station will be adjusted to be activated the next time by $\Delta\times\frac{1}{4}$ bit period (=$\Delta\times923$ ns), wherein $\Delta=-1$, later than the previous time.

Let us further assume, that the correction signal of the timing unit 6 is corr=1. This value of the correction signal corr keeps constant for the next testing period. This is noticed in the control unit 7 (phases 32 and 34) and the timing correction is kept constant (phase 39), in other words, by the timing correction value determined earlier.

In connection with the control unit 7 there is a sleep clock system with a certain constant time, that the normal fast clock is switched off and during which the sleep clock and its crystal is used. This constant time is shortened/lengthened for one step $\Delta=1(\Delta\times\frac{1}{4}$ bit period) respectively, when the output signal of the timing unit 6 changes. It must be kept in mind, however, that preferably one unit change of the output signal makes only one unit change in the timing signal.

In the procedure described above (FIG. 6), the signal corr received by the control unit 7 from the timing unit 6 is derived and the timing of the sleep clock system is changed with help of the derivate of the corr signal.

It must be noticed that the output signal corr received from the timing unit 6 is one indicator relating to the timing error correction in the control unit 17; additionally, also other information relating to the timing error correction can be used for controlling and synchronizing the timing.

The present invention has been described above with reference to its preferred embodiment only, but it is clear that the invention is in many ways applicable within the scope of the inventive idea determined by the enclosed claims.

What is claimed is:

1. A method for compensating internal timing errors of a mobile station, comprising steps of:

determining, from a channel impulse response, maximum signal samples that include a maximum amount of energy and position signals (maxpos) of the maximum signal samples;

determining by means of successive position signals (maxpos) a correction signal that indicates the magnitude and direction of a timing error of the mobile station, and using the correction signal to check and correct, if necessary, a clock timing of the mobile station so as to reduce or eliminate the timing error; wherein in a first processing phase for determining the correction signal a group of successive position signals (maxpos) are summed (sum) and the summed values (sum) of the signal samples are compared with predetermined decision parameters (ave-$a_n$, ave-$b_n$) and an intermediate signal (ot, op) is selected based on the comparison; and in a second processing phase for determining the correction signal a mean value (ave1) of a group (m items) that is formed from intermediate signals (ot, op) is calculated for use as a nominal value of the correction signal when checking and correcting, if necessary, the timing error.

2. A method in accordance with claim 1, characterized in that for the comparing step of the first processing phase an if-so decision table is formed, where first decision parameters are formed from a sum (ave=n×nom) of nominal values of the group of position signals (n items maxpos) and second decision parameters are formed from selected integral numbers ($a_n$, $b_n$), and from differences (ave-$a_n$, ave-$b_n$) of said first and second decision parameters a particular decision parameter is formed, with which the summed values (sum) of the group of successive position signals are compared, and based on the comparison, the value of the intermediate signal is selected.

3. A method in accordance with claim 1, characterized in that the intermediate signal (op) is formed cumulatively by summing an earlier calculated intermediate signal (op=op+ot).

4. A method in accordance with claim 1, characterized in that from a successive group of the intermediate signals (ot, op) a $D^{th}$ intermediate signal (D=2, 3, 4, . . . ) is separated, to be processed in the second processing phase.

5. A method in accordance with claim 1, characterized in that the mean value (ave1) calculated in the second processing phase is scaled by dividing it by a selected number (sca) and a resulting corrected mean value (corr) is used as the correction signal.

6. A circuitry for compensating internal timing errors of a mobile station, comprising:

a correlator for determining, from a channel impulse response, maximum signal samples that include a maximum amount of energy and position signals (maxpos) of the maximum signal samples; and a timing unit for determining by means of successive position signals (maxpos) a correction signal that indicates the magnitude and direction of a timing error of the mobile station, and for using the correction signal to check and correct, if necessary, a clock timing of the mobile station so as to reduce or eliminate the timing error; wherein said timing unit comprises a first filter unit and a second filter unit, said first filter unit comprising an n state floating register, a summer, and a decision unit, and wherein said second filter unit comprises an m state floating register and an averaging unit.

7. A circuitry as in claim 6, wherein said timing unit operates in a first processing phase when determining the correction signal by summing (sum) successive position signals (maxpos) and comparing the summed values (sum) of the signal samples with predetermined decision parameters (ave-$a_n$, ave-$b_n$), and selecting an intermediate signal (ot, op) based on the comparison; and wherein said timing unit operates in a second processing phase when determining the correction signal by calculating a mean value (ave1) of a group (m items) that is formed from intermediate signals (ot, op) for use as a nominal value of the correction signal when checking and correcting, if necessary, the timing error.

8. A circuitry in accordance with claim 6, wherein said decision unit uses an if-so decision table where first decision parameters are formed from a sum (ave=n×nom) of nominal values of the group of position signals (n items maxpos) and second decision parameters are formed from selected integral numbers ($a_n$, $b_n$), and from differences (ave-$a_n$, ave-$b_n$) of said first and second decision parameters a particular decision parameter is formed, with which the summed values (sum) of the group of successive position signals are compared, and based on the comparison, the value of the intermediate signal (ot) is selected.

9. A circuitry in accordance with claim 7, wherein said decision unit comprises a summer for forming the intermediate signal (op) cumulatively by summing an earlier calculated intermediate signal (op=op+ot).

10. A circuitry in accordance with claim 7, wherein said first filter unit further comprises a separator for separating from a group of successive intermediate signals (ot, op) a $D^{th}$ intermediate signal (D=2, 3, 4, . . . ).

11. A circuitry in accordance with claim 7, wherein said second filter unit further comprises a scaler for scaling the mean value (ave1) by dividing it by a selected number (sca) and a resulting corrected mean value (corr) is used as the correction signal.

12. A wireless mobile station comprising clock circuitry and further comprising clock timing correction circuitry, said clock timing correction circuitry comprising:

a correlator for determining, from a channel impulse response, maximum signal samples that include a maximum amount of energy and position signals (maxpos) of the maximum signal samples;

a timing unit for determining by means of successive position signals (maxpos) a correction signal that indicates the magnitude and direction of a timing error of the clock circuitry, and for using the correction signal to check and correct, if necessary, a clock timing of the clock circuitry so as to reduce or eliminate the timing error; wherein said timing unit operates in a first processing phase when determining the correction signal by summing (sum) successive position signals (maxpos) and comparing the summed values (sum) of the signal samples with predetermined decision parameters (ave-$a_n$, ave-$b_n$), and selecting an intermediate signal (ot, op) based on the comparison; and wherein said timing unit operates in a second processing phase when determining the correction signal by calculating a mean value (ave1) of a group (m items) that is formed from intermediate signals (ot, op) for use as a nominal value of the correction signal when checking and correcting, if necessary, the timing error.

13. A mobile station as in claim 12, wherein said timing unit comprises a first filter unit and a second filter unit, said first filter unit comprising an n state floating register, a summer, and a decision unit, and wherein said second filter unit comprises an m state floating register and an averaging unit.

14. A mobile station as in claim 12, wherein the comparing of the first processing phase uses an if-so decision table where first decision parameters are formed from a sum (ave=n×nom) of nominal values of the group of position signals (n items maxpos) and second decision parameters are formed from selected integral numbers ($a_n$, $b_n$), and from differences (ave-$a_n$, ave-$b_n$) of said first and second decision parameters a particular decision parameter is formed, with which the summed values (sum) of the group of successive position signals are compared, and based on the comparison, the value of the intermediate signal (ot) is selected.

15. A mobile station as in claim 12, wherein said timing unit comprises a summer for forming the intermediate signal (op) cumulatively by summing an earlier calculated intermediate signal (op=op+ot).

16. A mobile station as in claim 12, wherein said timing unit further comprises a separator for separating from a group of successive intermediate signals (ot, op) a $D^{th}$ intermediate signal (D=2, 3, 4, . . . ).

17. A mobile station as in claim 12, wherein said timing unit further comprises a scaler for scaling the mean value (ave1) by dividing it by a selected number (sca) and a resulting corrected mean value (corr) is used as the correction signal.

* * * * *